(12) United States Patent
Munafo et al.

(10) Patent No.: US 12,114,676 B2
(45) Date of Patent: Oct. 15, 2024

(54) WHITE CHOCOLATE WITH ENHANCED PROPERTIES AND METHODS OF MAKING

(71) Applicant: MARS, INCORPORATED, McLean, VA (US)

(72) Inventors: John P. Munafo, Hackettstown, NJ (US); Mark S. Mackey, Hackettstown, NJ (US); Nancy Chiang, Hackettstown, NJ (US); Laura Lukasewycz, Hackettstown, NJ (US)

(73) Assignee: Mars, Incorporated, McLean, VA (US)

( * ) Notice: Subject to any disclaimer, the term of this patent is extended or adjusted under 35 U.S.C. 154(b) by 730 days.

(21) Appl. No.: 15/520,442

(22) PCT Filed: Oct. 20, 2015

(86) PCT No.: PCT/US2015/056486
§ 371 (c)(1),
(2) Date: Apr. 20, 2017

(87) PCT Pub. No.: WO2016/064891
PCT Pub. Date: Apr. 28, 2016

(65) Prior Publication Data
US 2017/0311621 A1    Nov. 2, 2017

Related U.S. Application Data

(60) Provisional application No. 62/066,567, filed on Oct. 21, 2014.

(51) Int. Cl.
A23G 1/36    (2006.01)

(52) U.S. Cl.
CPC ............ *A23G 1/36* (2013.01); *A23G 2200/08* (2013.01)

(58) Field of Classification Search
None
See application file for complete search history.

(56) References Cited

U.S. PATENT DOCUMENTS

| | | | |
|---|---|---|---|
| 6,635,303 B1 | 10/2003 | Youcheff et al. | |
| 8,137,725 B2 | 3/2012 | Munafo et al. | |
| 2013/0280400 A1* | 10/2013 | Bartoshuk | A23L 27/39 426/538 |

FOREIGN PATENT DOCUMENTS

| | | |
|---|---|---|
| CN | 102281765 | 12/2011 |
| EP | 0821055 A2 | 3/2001 |
| EP | 1084622 A2 | 3/2001 |

(Continued)

OTHER PUBLICATIONS

International Search Report in PCT/US2015/056486.

(Continued)

*Primary Examiner* — Elizabeth Gwartney

(57) ABSTRACT

A white chocolate comprising nonendogenous amounts of isovaleric acid and/or 2-methylbutyric acid is provided. It has now been surprisingly discovered that small amounts of isovaleric acid, i.e., less than 400 ppb, and/or nonendogenous amounts of 2-methyl butyric acid can provide enhanced organoleptic properties to white chocolate, for an extended period of time, thereby enhancing the shelf life of the white chocolate. Methods of providing the white chocolate and providing a white chocolate having an enhanced shelf life are also provided.

27 Claims, 12 Drawing Sheets

(56) References Cited

FOREIGN PATENT DOCUMENTS

| EP | 1308094 | A2 | 5/2003 |
|---|---|---|---|
| RU | 2000123614 | A | 9/2002 |
| RU | 2318394 | C2 | 3/2008 |
| RU | 2471355 | C1 | 1/2013 |
| WO | 0245520 | A1 | 6/2002 |

OTHER PUBLICATIONS

"2-Methylbutyric Acid," 10 1 5-Year Plan, National Key Book Publishing Planning Project, Food Additives Handbook, 3rd Ed., 2012, 6 pages (with English translation).

* cited by examiner

WHITE CHOCOLATE WITH ENHANCED PROPERTIES AND METHODS OF MAKING

FIELD

A white chocolate having enhanced organoleptic attributes and/or shelf life is provided. Also provided are methods of making the white chocolate as well as methods of enhancing the shelf life of a white chocolate.

BACKGROUND

White chocolate is a well-known confection typically made with cocoa butter, sugar and milk solids and that is substantially free of nonfat cocoa solids.

In 2002, the U.S. Food and Drug Administration (USFDA) established a standard of identity (SOI) for white chocolate, which became effective on Jan. 1, 2004. See, 67 FR 62171. In accordance with this standard, an SOI white chocolate contains not less than 20% by weight cocoa fat, i.e., cocoa butter, not less than 14% by weight of total milk solids and not less than 3.5% by weight milkfat. In addition, SOI white chocolate in the U.S. cannot contain more than 55% by weight of nutritive carbohydrate sweetener.

In Europe, white chocolate is similarly defined with the exception that there is no limit on the content of nutritive carbohydrate sweetener. See Directive 2000/36/EC (Jun. 23, 2000). The standard of identity for white chocolate in Canada is set forth in Canadian Food and Drug Regulations, C.R.C., c.870, Section B.04.009, pp. 218-219. The standard of identity for chocolate in Australia is set forth in Australia New Zealand Food Standards Code, Chapter 1, Standard 1.1.2—Supplementary Definitions for Foods, which applies to any product named "chocolate," including white chocolate. Because of the absence of nonfat cocoa solids, the flavor attributes of SOI white chocolate are quite different than chocolates comprising nonfat cocoa solids such as milk and dark chocolates.

White chocolate-like products are also made that are substantially free of nonfat cocoa solids but that do not meet a standard of identity for white chocolate. These products are often referred to as non-standard of identity (non-SOI) white chocolates, and are known in the art by such names as white compound coating and white confectionery coating. Such non-SOI white chocolates typically comprise other vegetable-derived fats and/or oils in addition to or as a replacement for cocoa butter or milkfat. For example, they may contain palm oil, coconut oil, partially hydrogenated palm kernel oil, and other such components. They may also comprise other sweeteners in addition to, or as a replacement for, nutritive carbohydrate sweeteners. In addition, they may contain colors, flavors, and other ingredients that may not be permitted in a white chocolate according to the requirements of a standard of identity.

As is the case with SOI white chocolates, the absence of nonfat cocoa solids makes the flavor of non-SOI white chocolates quite different than chocolates comprising nonfat cocoa solids. Furthermore, the alternative and additional ingredients used in non-SOI white chocolate compositions have a significant impact on their flavor and textural attributes compared to SOI white chocolates.

Both SOI and non-SOI white chocolates share the general characteristics of comprising a dairy or dairy-derived component and a sweetener in a fat continuous system and being substantially free of nonfat cocoa solids. Such compositions based on dairy or dairy-derived components and sweeteners in a fat system pose significant challenges when attempting to modify particular flavor and/or textural attributes. These attributes may include a lack of richness and roundedness in flavor and the presence of oxidized and stale off-notes. The flavors of dairy, sweetener, and fat components will be more prominent when no nonfat cocoa solids are present in the composition. Consequently, any undesired attributes of the components will likely be more noticeable in the finished product. The compositions may also have a waxy or fatty mouthfeel rather than a smooth, silky feeling in the mouth during consumption. These organoleptic defects can become more prominent over time and can thus shorten the shelf life of white chocolates.

Consumers, however, expect and desire certain organoleptic properties in a confection that is described as a white chocolate. Therefore, it would be highly desirable if the organoleptic properties of white chocolate, whether an SOI white chocolate or a non-SOI white chocolate, could be modified to provide a white chocolate having an improved flavor and/or improved mouth feel. It would be even more desirable if the modifications occurred over time and thus enabled an increased shelf life.

International Publication No. WO 03/037099 is directed to a process to manipulate the flavor of chocolate by adding non-cocoa and/or milk/dairy flavor attributes to a chocolate mass. The publication states that dark, milk or white chocolate may be modified. The described process appears to rely on flavor generation from the reaction of flavor precursors selected from proline, ornithine and protein hydrolysate with any of rhamnose, fructose or sucrose. There is, however, no mention or suggestion of employing isovaleric acid and/or 2-methyl butyric acid to enhance the organoleptic properties of white chocolate.

U.S. Pat. No. 8,137,725 discloses that the addition of amounts of isovaleric acid greater than 500 ppb to white chocolate can provide the white chocolate so modified with enhanced organoleptic properties. There is no disclosure or suggestion that lower amounts of isovaleric acid would be effective, nor is there any disclosure of the usefulness of 2-methyl butyric acid, in any amount, to achieve such a purpose. Additionally, there is no mention of the effect of the addition of nonendogenous amounts of isovaleric acid to white chocolate over time.

SUMMARY

A white chocolate comprising nonendogenous amounts of isovaleric acid and/or 2-methylbutyric acid is provided. It has now been surprisingly discovered that small amounts of isovaleric acid, i.e., less than 400 ppb, and/or nonendogenous amounts of 2-methyl butyric acid can provide enhanced organoleptic properties to white chocolate, for an extended period of time, thereby enhancing the shelf life of the white chocolate. Methods of providing the white chocolate and providing a white chocolate having an enhanced shelf life are thus provided.

In one embodiment, the organoleptically enhanced white chocolate will comprise a nonendogenous amount of isovaleric acid less than 400 ppb and/or a nonendogenous amount of 2-methyl butyric acid. The white chocolate may comprise a nonendogenous amount of 2-methyl butyric acid greater than 0 and less than 3000 ppb, or less than 2000 ppb, or less than 1000 ppb. In some embodiments, the white chocolate may meet the US, European, Canadian and/or Australian standards of identity for white chocolate, while in others, the white chocolate may be a nonstandard of identity white chocolate.

A method of making the white chocolate is also provided and comprises adding an amount of 2-methyl butyric acid and/or less than 400 ppb of isovaleric acid to the white chocolate during or after the preparation thereof. The 2-methyl butyric acid can be added in amounts greater than 0 ppb and up to about 3000 ppb, or up to 2000 ppb, or up to 1000 ppb. The isovaleric acid and/or 2-methyl butyric acid may be added during the formulation of the white chocolate, or, may be added to a white chocolate melted after the formulation thereof.

The addition of small, nonendogenous amounts of isovaleric acid and/or 2-methyl butyric acid can enhance the organoleptic properties of the white chocolate, and in some embodiments, these enhanced properties can be provided over an extended period of time. Thus, in yet another embodiment, methods of providing a white chocolate having an extended shelf life are provided. The method comprises adding less than 400 ppb isovaleric acid and/or an amount of 2-methyl butyric acid to the white chocolate. A white chocolate so prepared is expected to have a taste and/or texture attribute better than that of a white chocolate not comprising the added amount of isovaleric acid and/or 2-methyl butyric acid, and may exhibit this better taste and/or texture attribute for an extended period of time. The better taste and/or texture can include an increased perception of an attribute correlated with increased consumer liking, a decreased perception of an attribute correlated with decreased consumer liking, or both.

In some embodiments, the white chocolate may, for example, exhibit a cooked milk, buttery, caramel essence, vanilla and/or nutty attribute greater than that of a white chocolate not comprising the added amount of isovaleric acid and/or 2-methyl butyric acid at 6 weeks, 12 weeks, 26 weeks, 30 weeks or even 34 weeks or more. Of these, a cooked milk attribute is particularly desirable in white chocolate and is correlated with increased consumer liking, and in some embodiments, it may be this attribute that is enhanced in the white chocolate as compared to a white chocolate without the added nonendogenous amount of isovaleric acid and/or 2-methyl butyric acid A white chocolate so prepared may also have a nonfat dried milk attribute score that is lower than that of a white chocolate not comprising the added amount of isovaleric acid and/or 2-methyl butyric acid at 6 weeks, 12, weeks, 26 weeks, 30 weeks, or even 34 weeks or more. Nonfat dried milk perception is negatively correlated with consumer liking meaning that higher attributes scores are less desirable and lower attribute scores are more desirable.

DETAILED DESCRIPTION

Figure 1:
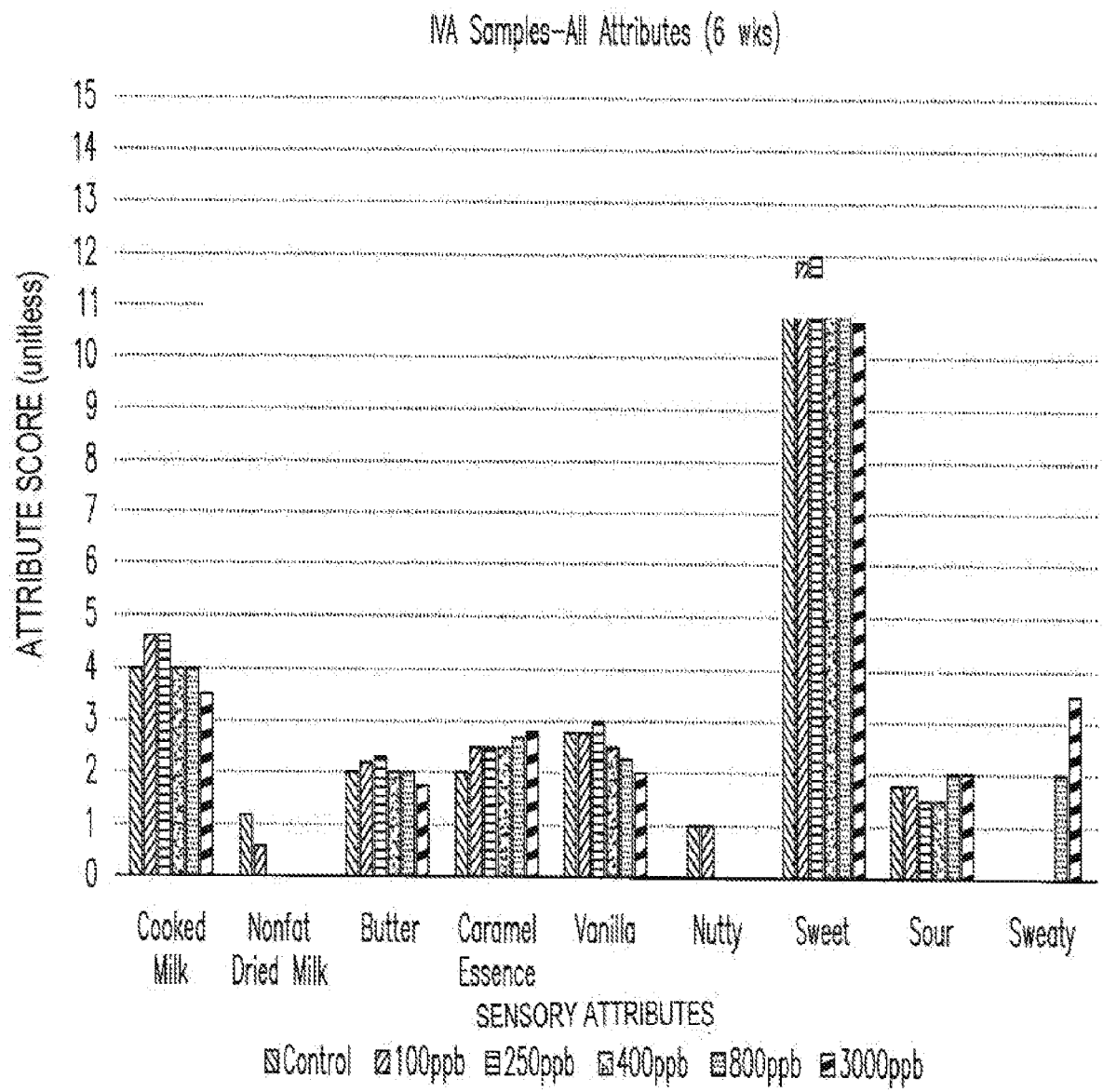
FIG. 1 is a bar graph illustrating the results of a trained panel evaluation of a control white chocolate and white chocolate containing 100, 250, 400, 800 and 3000 ppb isovaleric acid ("IVA") at 6 weeks.
Figure 2:
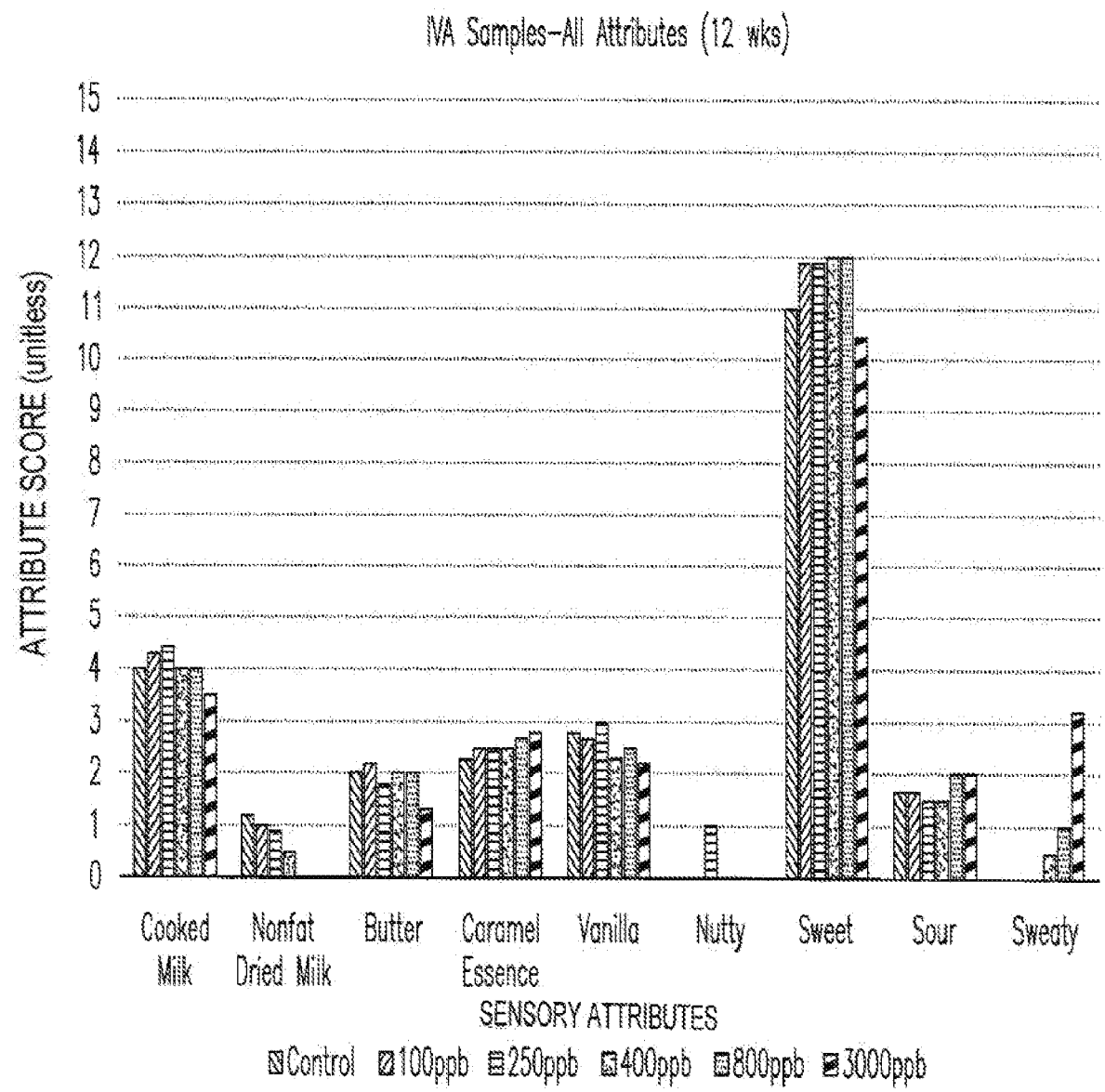
FIG. 2 is a bar graph illustrating descriptive analysis results of a control white chocolate and white chocolate containing 100, 250, 400, 800 and 3000 ppb isovaleric acid ("IVA") at 12 weeks.
Figure 3:
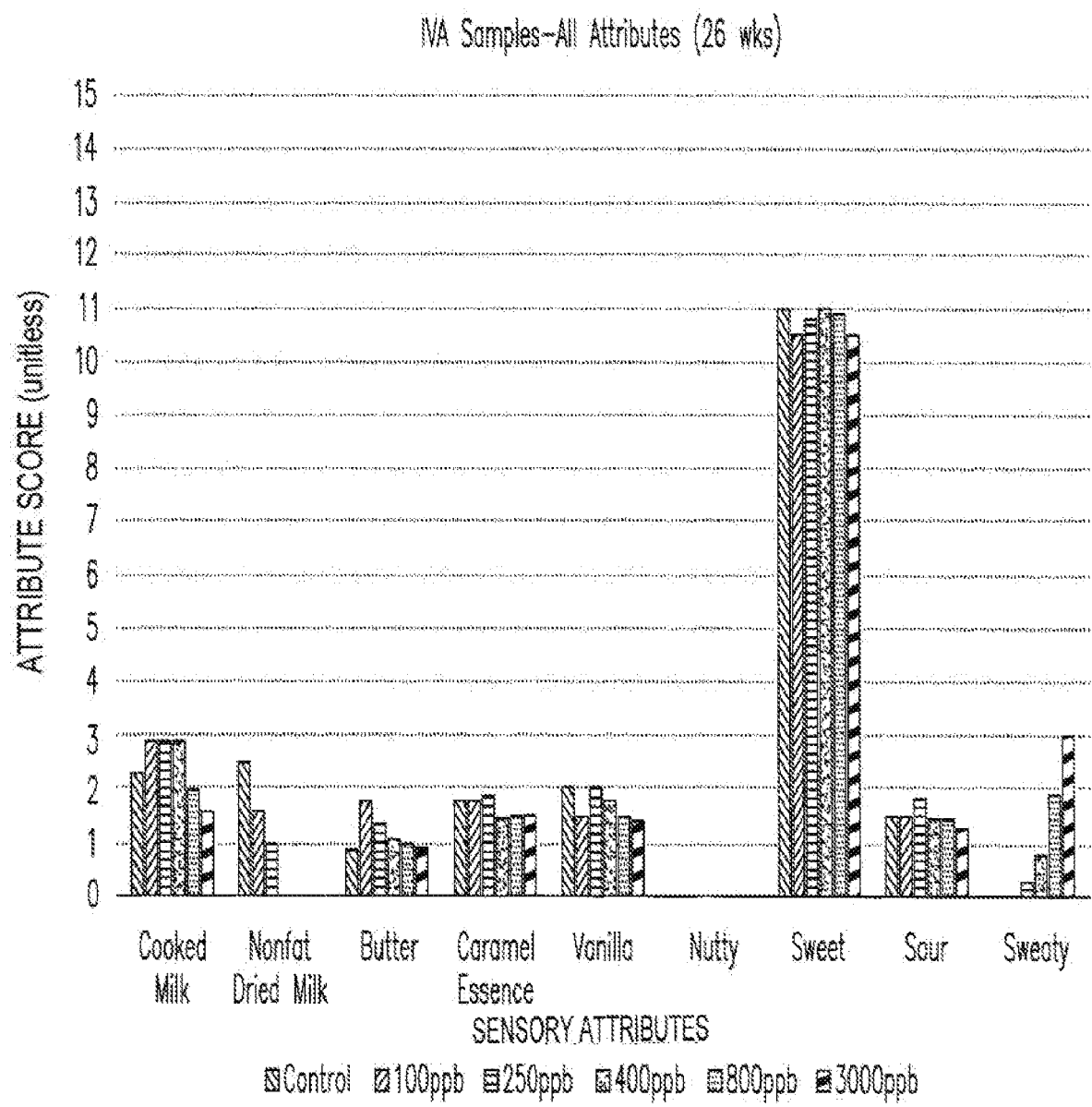
FIG. 3 is a bar graph illustrating descriptive analysis results of a control white chocolate and white chocolate containing 100, 250, 400, 800 and 3000 ppb isovaleric acid ("IVA") at 26 weeks.
Figure 4:
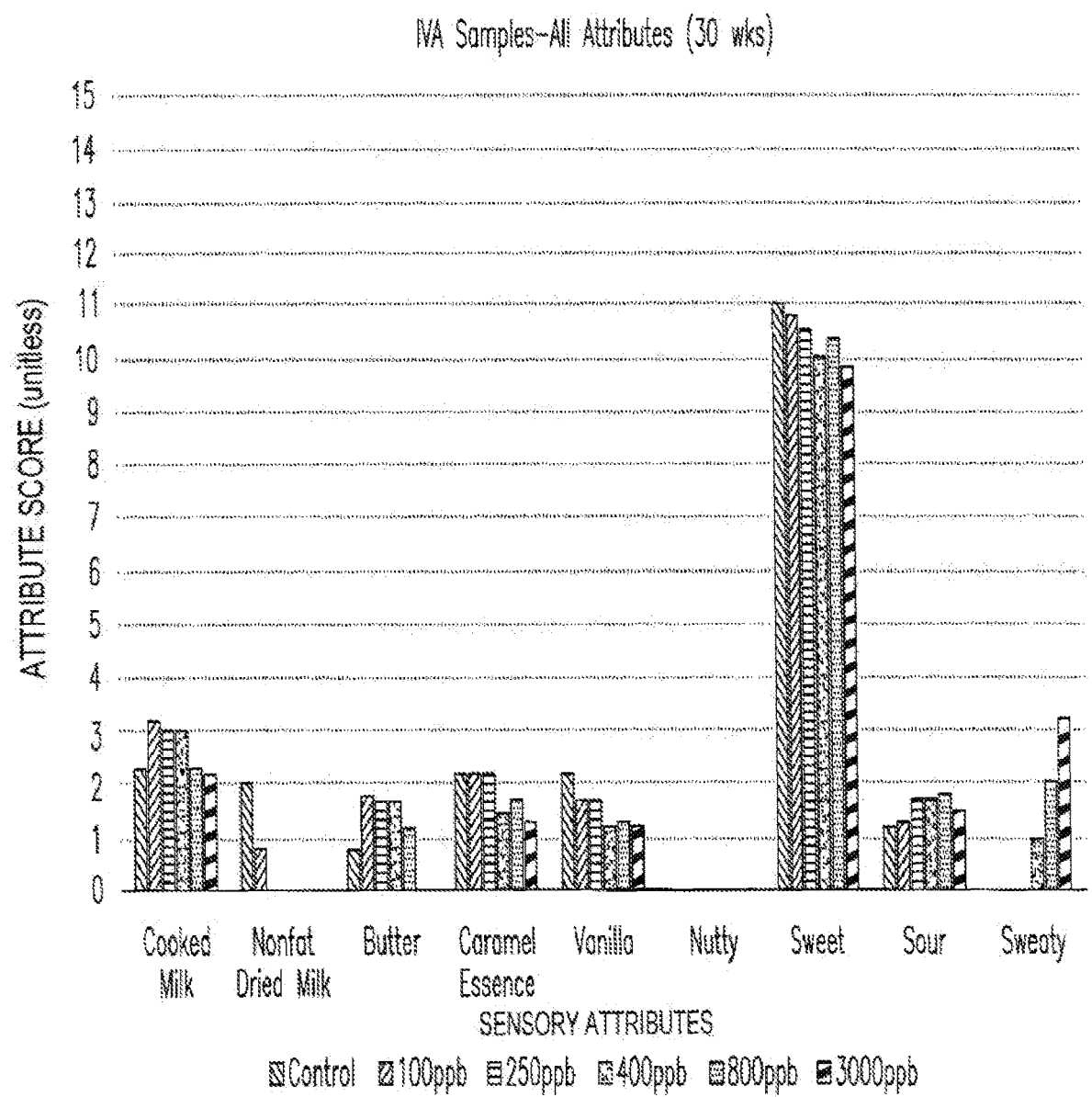
FIG. 4 is a bar graph illustrating descriptive analysis results of a control white chocolate and white chocolate containing 100, 250, 400, 800 and 3000 ppb isovaleric acid ("IVA") at 30 weeks.
Figure 5:
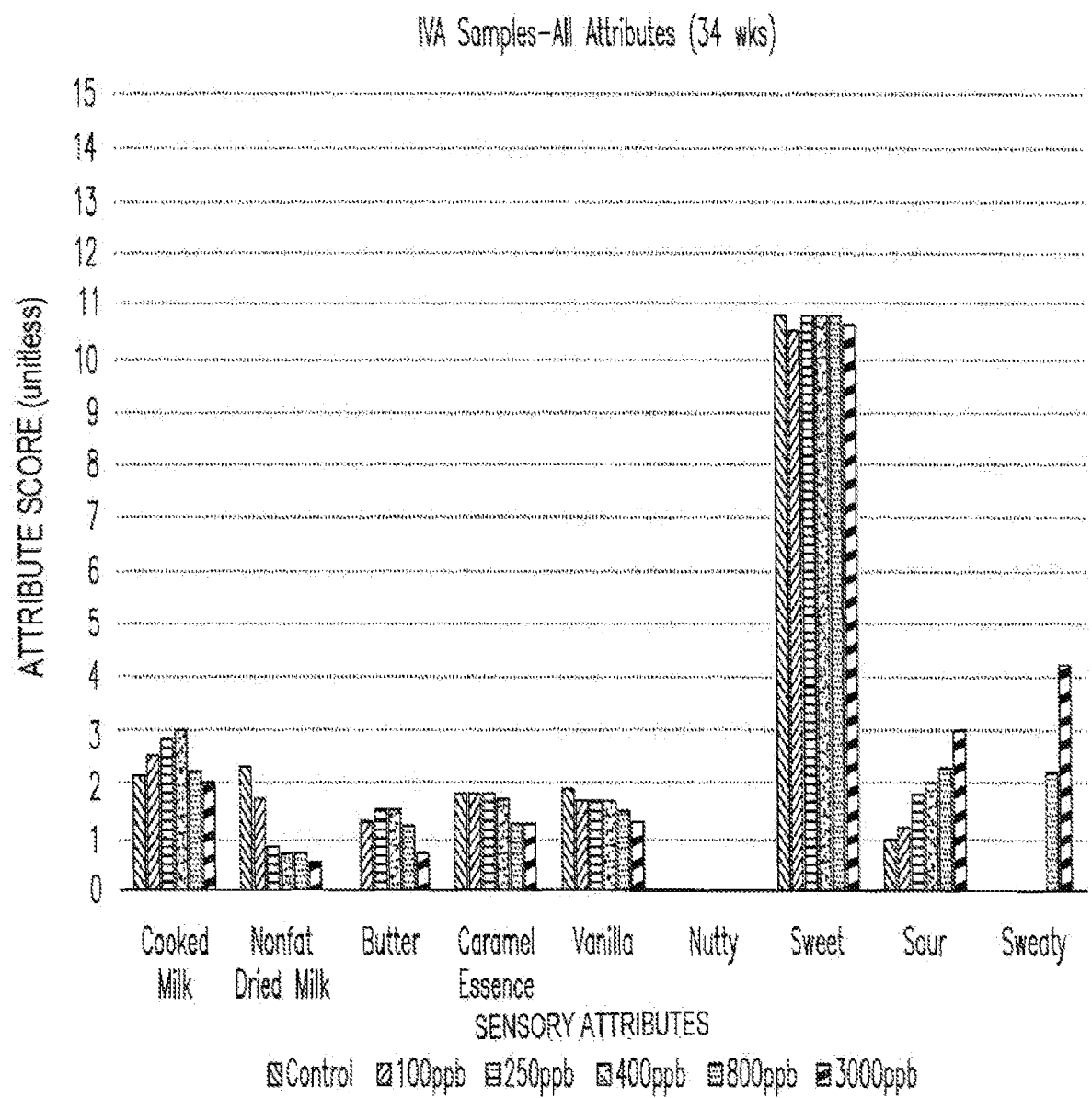
FIG. 5 is bar graph illustrating descriptive analysis results of a control white chocolate and white chocolate containing 100, 250, 400, 800 and 3000 ppb isovaleric acid ("IVA") at 34 weeks.
Figure 6:
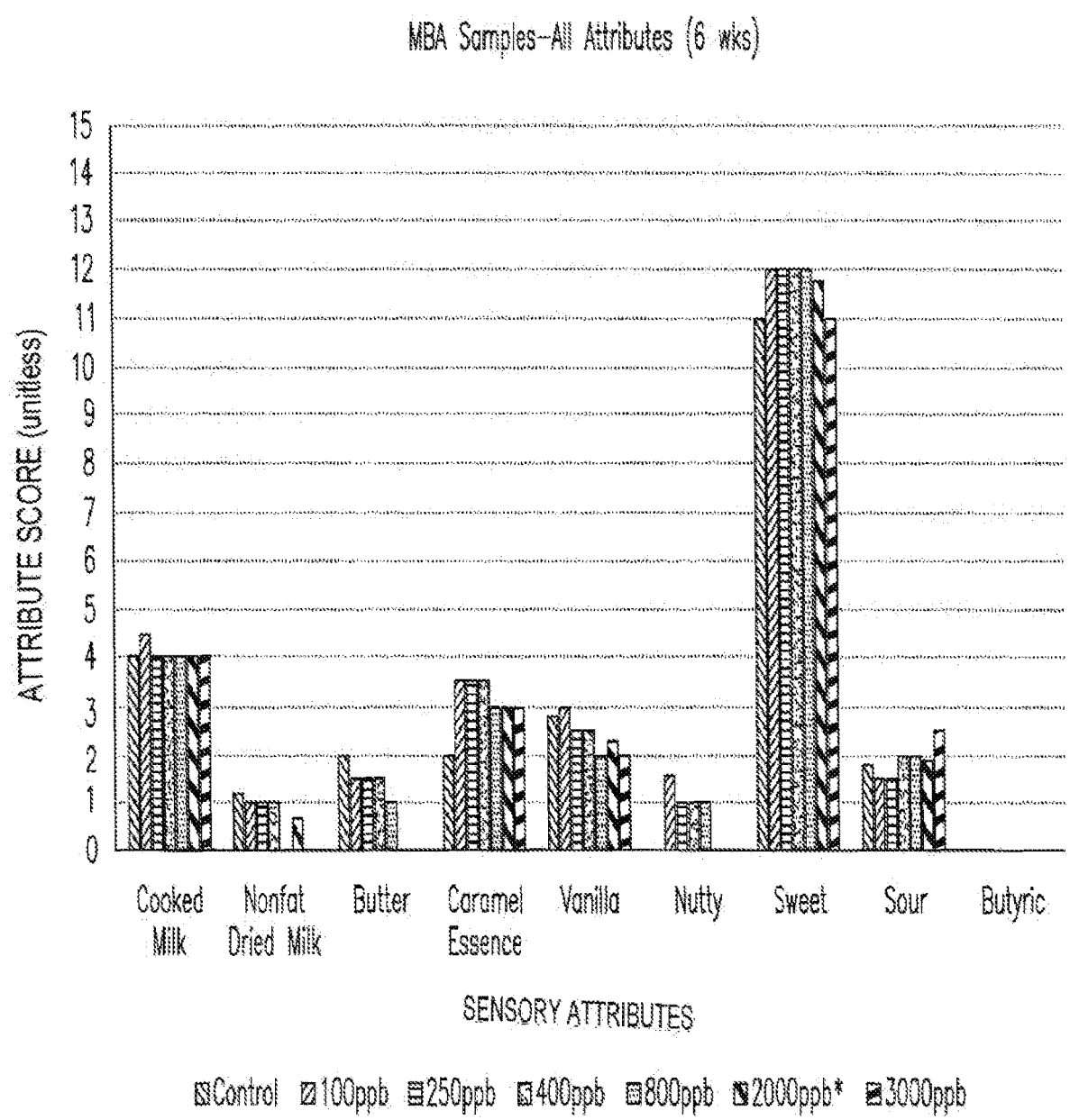
FIG. 6 is a bar graph illustrating descriptive analysis results of a control white chocolate and white chocolate containing 100, 250, 400, 800, 2000 and 3000 ppb 2-methyl butyric acid ("MBA") at 6 weeks.
Figure 7:
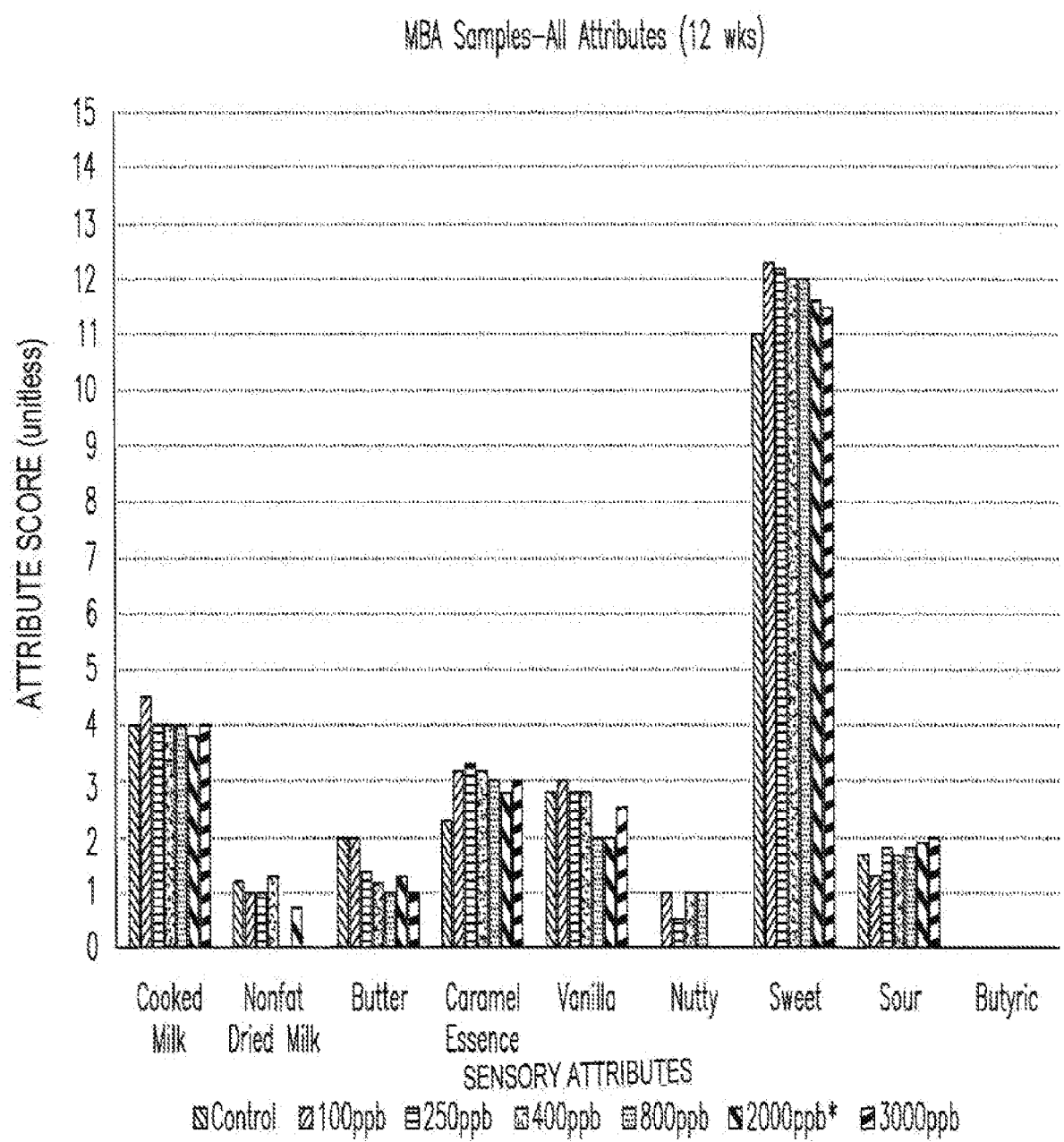
FIG. 7 is a bar graph illustrating descriptive analysis results of a control white chocolate and white chocolate containing 100, 250, 400, 800, 2000 and 3000 ppb 2-methyl butyric acid ("MBA") at 12 weeks.
Figure 8:
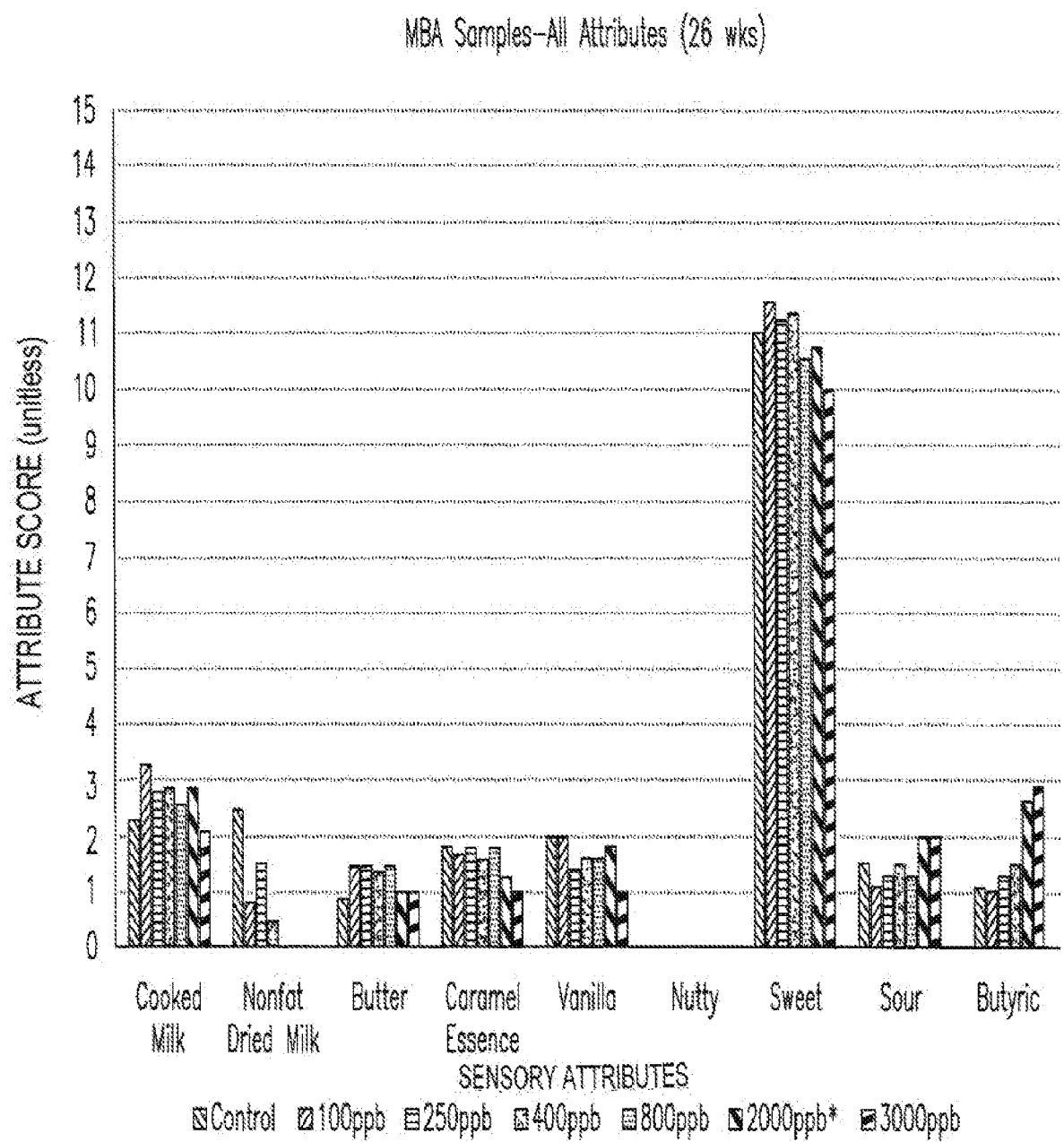
FIG. 8 is a bar graph illustrating descriptive analysis results of a control white chocolate and white chocolate containing 100, 250, 400, 800, 2000 and 3000 ppb 2-methyl butyric acid ("MBA") at 26 weeks.
Figure 9:
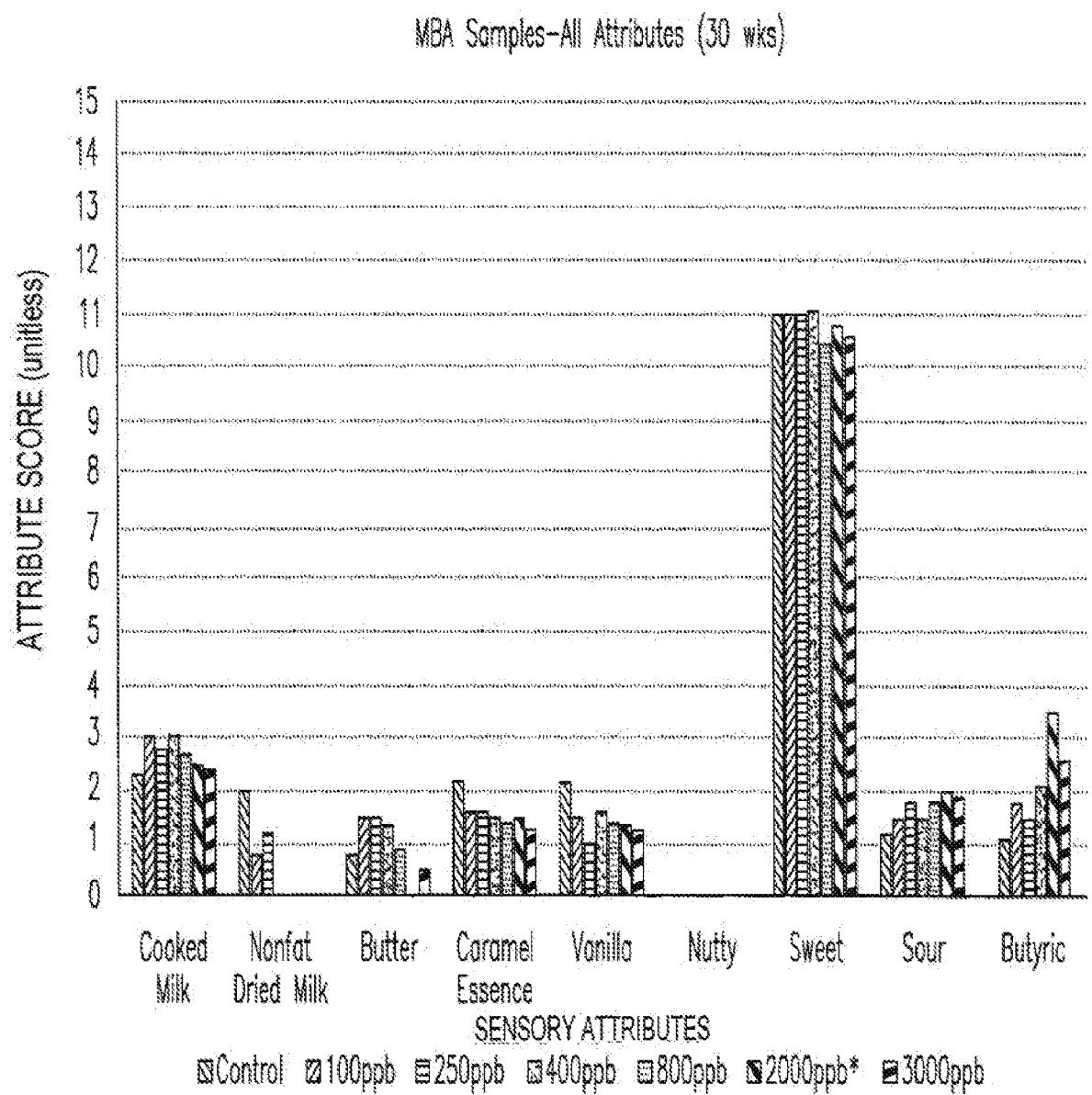
FIG. 9 is a bar graph illustrating descriptive analysis results of a control white chocolate and white chocolate containing 100, 250, 400, 800, 2000 and 3000 ppb 2-methyl butyric acid ("MBA") at 30 weeks.
Figure 10:
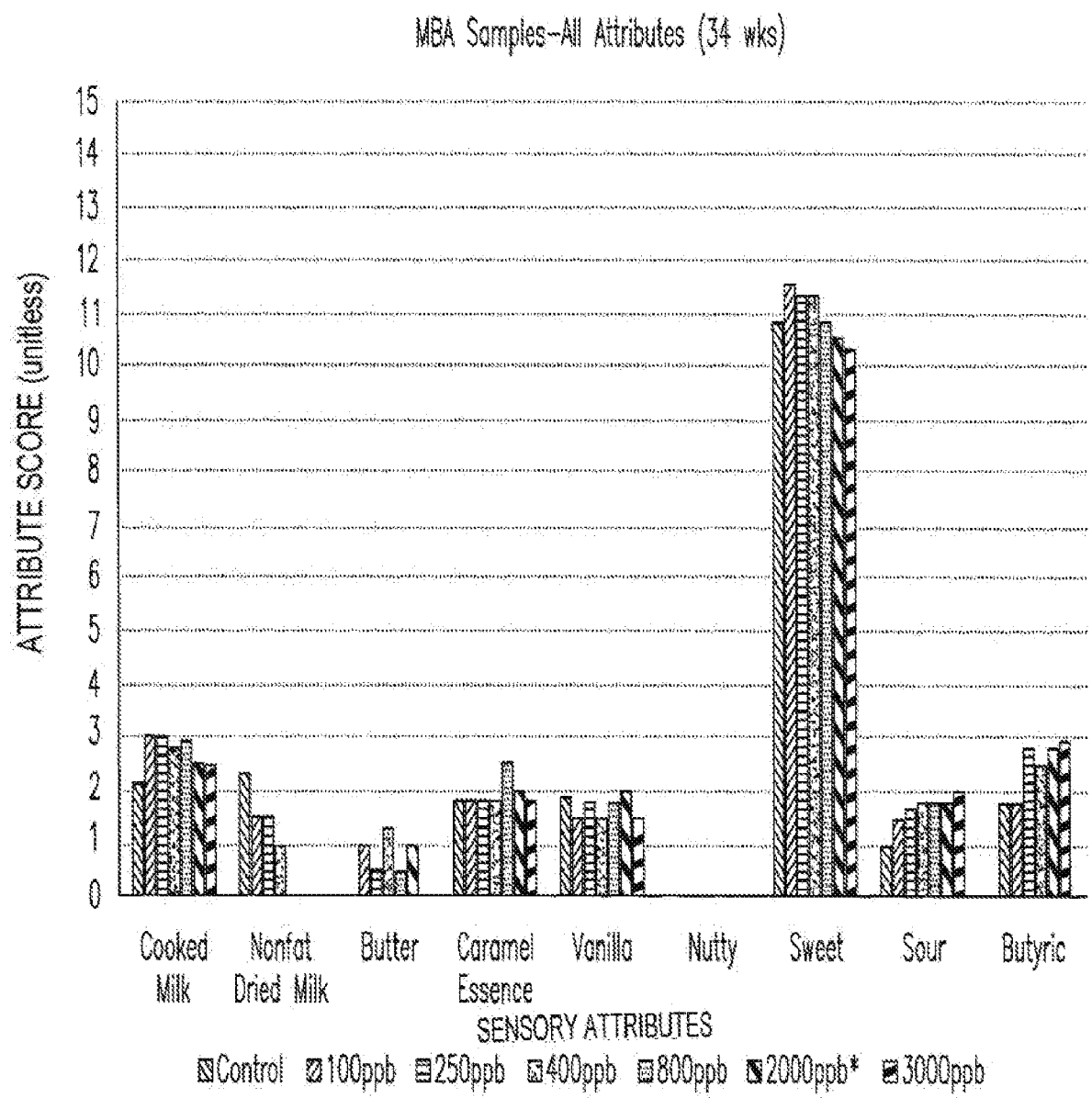
FIG. 10 is a bar graph illustrating descriptive analysis results of a control white chocolate and white chocolate containing 100, 250, 400, 800, 2000 and 3000 ppb 2-methyl butyric acid ("MBA") at 34 weeks.

For the purposes of this application, a "standard of identity" or "SOI" for an edible product refers to a standard established by a regulatory agency of a government or a recognized standards organization, that lays out the requirements for an edible product to be called by a specific name, where the standard may include requirements on allowed and non-allowed ingredients, minimum and maximum percentages of ingredients, processing parameters, and other stipulations.

A "standard of identity chocolate" or "SOI chocolate" refers to a chocolate that meets the requirements of a standard established by a regulatory agency of a government or a recognized standards organization in effect at the time of this application for an edible product to be called "chocolate." In addition, standards of identity may be established for various types of chocolate, for example, white chocolate, milk chocolate, or dark chocolate. Therefore, one skilled in the art would readily understand the meaning of the term, "standard of identity white chocolate" or "SOI white chocolate." A white chocolate specified as meeting the United States standard of identity meets the requirements established in 21 C.P.R. § 163.124 in effect as of the filing date of this application, which is incorporated by reference.

On the other hand, a "non-standard of identity chocolate" or "non-SOI chocolate" refers to a chocolate-like product that does not meet the requirements of a standard established by a regulatory agency of a government or a recognized standards organization for an edible product to be called "chocolate." In addition, one skilled in the art would readily understand that the use of the modifier, "non-standard of identity," before the name of any type of chocolate, for example, white chocolate, milk chocolate, or dark chocolate, describes a chocolate-like product that does not meet the requirements of an established standard of identity for the indicated type of chocolate. In particular, for the present application, a "non-standard of identity white chocolate" or "non-SOI white chocolate" refers to a white chocolate-like product that does not meet the requirements of an established standard of identity for "white chocolate.

Nonstandard of identity white chocolates include white chocolate-like products known in the art by such names as white compound coating and white confectionery coating.

Notwithstanding the above definitions, the term "white chocolate" in the present application is intended to encompass all white chocolates and white chocolate-like products, whether they meet the requirements of an established standard of identity for "white chocolate" or not, unless expressly stated otherwise, or unless it is clear from the context that a more limited definition is intended.

The phrase, "substantially free of nonfat cocoa solids," when used to describe the white chocolate and white chocolate-like products, means that nonfat cocoa solids are excluded from the product to the greatest extent possible. Practically speaking, it may be difficult to completely exclude nonfat cocoa solids in a manufacturing environment, but the product will contain less than 0.5% by weight nonfat cocoa solids, less than 0.25 wt % nonfat cocoa solids, or even less than 0.1 wt % nonfat cocoa solids. Potential sources of nonfat cocoa solids include cocoa beans or nibs, chocolate liquor, cocoa butter, cocoa powder, finished chocolate, and other materials derived from cocoa beans.

The term, "flavor," as used herein, means "an overall integrated perception of all the contributing senses (smell, taste, sight, feeling, and sound) at the time of food consumption." ("Food Chemistry, 2nd Edition, Revised and Expanded," Owen R. Fennema, editor; Marcel Dekker, Inc.; New York, New York; 1985.) The term, "mouthfeel," is used to specifically describe the sensation of feeling in the mouth during consumption of a food.

"Organoleptically enhanced," when used to describe the white chocolate and white chocolate-like products, means that the organoleptic properties, or properties sensed during food consumption, are changed in a way that is preferred by the consumer over conventional white chocolate and white chocolate-like products. This can include an increased perception expressed as a higher attribute score for attributes positively correlated with consumer liking, a decreased perception expressed as a lower attribute score for attributes negatively correlated with consumer liking, or both.

A "dairy or dairy-derived component" is a milk (mammalian) or a product derived from milk, in any convenient form, e.g., a liquid or a dry powder. Examples of dairy or dairy-derived components are provided in the specification.

A "fat continuous system" is a food system in which a continuous fat or oil matrix surrounds the other components of the food system which are distributed throughout the fat or oil matrix.

"Substantially free of free water," when used to describe the white chocolate and white chocolate-like products, means that free or unbound water is excluded from the product to the greatest extent possible. Practically speaking, it may be difficult to completely exclude free water in a manufacturing environment, but the product should preferably contain less than 3% free water, and more preferably, less than 1% free water. Potential sources of free water include fresh dairy ingredients such as milk and cream, and other ingredients containing residual water. Free water and unbound water are synonymous.

A "nonendogenous amount" means an amount of isovaleric acid ("IVA") or butyric acid that is not endogenously or naturally present in the white chocolate to begin with. That is, white chocolates may be prepared from components such as dairy ingredients that include endogenous amounts of either or both isovaleric acid or 2-methyl butyric acid ("MBA"). For example, white chocolate may contain up to about 70 to 75 ppb of endogenous isovaleric acid. Some components of white chocolate may also contain up to 100 ppb 2-methyl butyric acid. Such amounts are not considered "nonendogenous amounts" as that phrase is used herein. For example, if a white chocolate contains an endogenous amount of isovaleric acid of 50 ppb, and has 100 ppb nonendogenous isovaleric acid add to it, the nonendogenous amount of isovaleric acid is 100 ppb, though the overall content of isovaleric acid in the white chocolate would be 150 ppb.

Finally, "enhanced shelf stability" means that the inventive white chocolate exhibits a taste or texture attribute better than that of a white chocolate that has not had the nonendogenous amount of isovaleric acid and/or 2-methyl butyric acid added thereto at a particular time point. It is to be understood that for some attributes, a higher score is "better", while for others, a lower score may be "better". That is, those of ordinary skill in the art of confectionery are aware that, e.g., a higher cooked milk attribute score indicating a more intense perception leads to greater consumer acceptance, and so in such an instance, a higher score in the cooked milk attribute area would be "better" or "enhanced". On the other hand, a low nonfat dried milk attribute score indicating a less intense perception is desired in white chocolates, as a white chocolate scoring a lower score on this attribute will generally experience greater consumer acceptance than a white chocolate having a higher nonfat dried milk score. In this instance, a lower score in the nonfat dried milk attribute than a white chocolate not having the added nonendogenous amount of isovaleric acid and/or 2-methyl butyric acid would mean that the inventive white chocolate scored better in this attribute than the noninventive white chocolate.

An inventive white chocolate may thus typically have a nonfat dried milk attribute score that is lower than that of a white chocolate not comprising the added amount of isovaleric acid and/or 2-methyl butyric acid, and may exhibit this enhancement at 6 weeks, 12, weeks, 26 weeks, 30 weeks, or even 34 weeks or more. Or, an inventive white chocolate may have a cooked milk, buttery, caramel essence, vanilla and/or nutty attribute score that is higher than a white chocolate not comprising the added amount of isovaleric acid and/or 2-methyl butyric acid, and that further may exhibit this enhancement for an extended period of time, e.g., for time periods of at least 6 weeks, or 12 weeks, or 26 weeks, or 30 weeks or even 34 weeks or more.

In some embodiments, more than one taste or texture attribute can be enhanced, or better, in an inventive white chocolate as compared to a noninventive white chocolate. For example, in some embodiments, the inventive white chocolate may have a cooked milk, buttery, caramel essence, vanilla and/or nutty attribute score that is higher than a nonfat dried milk attribute score that is lower than a white chocolate not comprising the added amount of isovaleric acid and/or 2-methyl butyric acid for an extended period of time, e.g., for time periods of at least 6 weeks, or 12 weeks, or 26 weeks, or 30 weeks or even 34 weeks or more.

The taste and/or texture attributes referred to herein can reliably be/are measured by panels of trained testers. In such testing, a trained panel of sensory scientists may conduct a round-table evaluation of product samples for taste attributes using a 15 point line scale where the attributes are anchored to standards. Standards can include, but are not limited to, unsalted butter as a standard for the butter taste attribute, caramelized sugar for the caramel essence taste attribute, vanilla extract as an aroma or in 3% sugar solution for the vanilla taste attribute; commercially available nonfat dried milk for the nonfat dried milk attribute, butyric acid for the developed milk attribute; and isovaleric acid aroma for the sweaty taste attribute. The standard for cooked milk can be prepared by heating whole milk until it begins to boil and then continuing to heat for 15-20 minutes. Results and conclusions of the sensory scientists are based on their extensive experience with intensity differences that correlate to consumer perceptible differences.

In other embodiments, the taste and/or texture attributes are measured using sensory analysis methods known as descriptive analysis techniques. The Spectrum™ method of descriptive analysis is described in MORTEN MEILGAARD, D. Sc. ET AL., SENSORY EVALUATION TECHNIQUES (3d ed. 1999). The Spectrum™ method is a custom design approach meaning that the highly trained panelists who generate the data also develop the terminology to measure the attributes of interest. Further, the method uses intensity scales created to capture the intensity differences being investigated. These intensity scales are anchored to a set of well-chosen references. Using these references helps make the data universally understandable and usable over time. This ability to reproduce the results at another time and with another panel makes the data potentially more valuable than analytical techniques which offer similar reproducibility but lack the ability to fully capture the integrated sensory experiences as perceived by humans.

It has surprisingly been discovered that the addition of isovaleric acid in amounts of less than 400 ppb and/or nonendogenous amounts of 2-methyl butyric acid to a white chocolate can enhance the organoleptic properties of the white chocolate. In particular, it has been found that white chocolate to which less than 400 ppb isovaleric acid and/or nonendogenous amounts of 2-methyl butyric acid has/have been added is likely to be perceived as having enhanced organoleptic properties and/or shelf stability as compared to a white chocolate having no such nonendogenous amounts of either added.

This is especially surprising as isovaleric acid has been described as having unpleasant, rancid, sour and/or sweaty flavor attributes, even at threshold concentrations in water or oil. In fact, in the field of sensory science, isovaleric acid is used as a reference for demonstrating the flavor characteristic of "dirty socks" to panelists performing descriptive analysis of food products (ASTM DS66, "Aroma and Flavor Lexicon for Sensory Evaluation: Terms, Definitions, References, and Examples," Gail Vance Civille and Brenda G. Lyon, Eds.; American Society for Testing and Materials, West Conshohocken, PA, 1996, page 86). While the use of isovaleric acid to produce organoleptically enhanced white chocolate has been described, there has previously been no appreciation that the low amounts, e.g., less than 400, or 375, or 350, or 325, or 300 ppb, or 275, or 250 ppb, or 225, ppb, or 200 ppb, or 175 ppb, or 150 ppb or 125 ppb, as described herein could provide the disclosed advantages.

2-methyl butyric acid, on the other hand, is associated with sweaty, sour and cheesy flavor attributes. While structurally similar to isovaleric acid, the benefits of adding nonendogenous amounts of 2-methyl butyric acid would yet not be expected at least because other compounds of highly similar structure, such as valeric acid (pentanoic acid), butyric acid (butanoic acid) and isobutyric acid (2-methylpropanoic acid) have been found to impart undesirable organoleptic attributes, i.e., a cheesy, sour milk or rancid character, when added to white chocolate.

In particular, additions of small amounts (e.g., from 600 to 900 ppb) of the highly structurally similar flavor ingredients valeric acid, butyric acid and isobutyric acid result in a white chocolate having a sharp cheese-like character and no enhanced organoleptic attributes. Table 1 shows the structures and formulas of these compounds, as well as isovaleric and 2-methyl butyric acid, and their impact on the organoleptic and/or shelf stability of white chocolate:

TABLE 1

| Name | Structure | Formula | Organoleptic properties and/or Shelf life enhanced? |
|---|---|---|---|
| Isovaleric acid | | $(CH_3)_2CHCH_2COOH$ | Yes |
| Valeric acid | | $CH_3(CH_2)_3COOH$ | No |
| Butyric acid | | $CH_3(CH_2)_2COOH$ | No |
| Isobutyric acid | | $(CH_3)_2CHCOOH$ | No |

TABLE 1-continued

| Name | Structure | Formula | Organoleptic properties and/or Shelf life enhanced? |
|---|---|---|---|
| 2-methylbutyric acid | 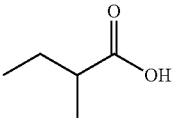 | $CH_3CH_2CHCH_3COOH$ | Yes |

As can be seen, though these compounds are highly similar structurally, this is not a predictor of whether or not they will be effective to provide white chocolate with enhanced organoleptic properties and/or shelf life. These findings thus show the unpredictable nature of flavor ingredients and emphasize that the discovery that nonendogenous amounts of isovaleric acid of less than 400 ppb, and/or nonendogenous amounts of 2-methyl butyric acid could be used to enhance the organoleptic attributes of white chocolate is very surprising and unexpected.

The amount of added, nonendogenous isovaleric acid will be sufficient to enhance one or more organoleptic properties and/or the shelf stability of the white chocolate. Generally speaking, the nonendogenous amount of isovaleric acid used will be less than about 400 ppb, or less than 375, 350, 325, 300, 275, 250, 225, 200, 175, 150, 125, or even less than 100 ppb.

In other embodiments, greater than 100 ppb nonendogenous isovaleric acid can be added, or greater than 125, 150, 175, 200, 225, 250, 275, 300, 325, 350, or 375 ppb. Or, in other embodiments, from 100 to 400 ppb nonendogenous isovaleric acid can be added, or from 125 ppb to 375 ppb, or from 150 to 350 ppb, or from 175 to 325 ppb. In still other embodiments, from 100 ppb to 375 ppb can be used, as can 100 to 350 ppb, or 100 to 325 ppb, or 100 to 300 ppb, or from 100 to 275 ppb, or 100 to 250 ppb.

The amount of 2-methyl butyric acid in the white chocolate will generally be enough to enhance at least one organoleptic property, and/or the shelf stability, of the white chocolate and not so much to detrimentally impact the same. In some embodiments, the nonendogenous amount of 2-methyl butyric acid will be greater than 10 ppb, or 50 ppb, or 100 ppb, or 150 ppb, or 200 ppb, or 250 ppb, or 300 ppb, or 350 ppb, or 400 ppb, or 500 ppb, or 600 ppb, or 700 ppb, or 800 ppb, 900 ppb, 1000 ppb, 1250 ppb, 1500 ppb, 1750 ppb, or 2000 ppb, or even up to or greater than 3000 ppb.

On the other hand, the nonendogenous amount of 2-methyl butyric acid can be less than 3000 ppb, or 2000 ppb, or 1750 ppb, or 1500 ppb, or 1250 ppb, or 1000 ppb, or 900 ppb, or 800 ppb, or 700 ppb, or 600 ppb, or 500 ppb, or 400 ppb, or 350 ppb, or 300 ppb, or 250 ppb, or 200 ppb, or 150 ppb, or 100 ppb, or even less than 50 ppb.

And so, the range of 2-methyl butyric acid can thus range from 10 ppb to 3000 ppb, or from 50 ppb to 2000 ppb, or from 100 ppb to 1750 ppb, or from 150 ppb to 1500 ppb, or from 200 ppb to up to 1000 ppb, or any other combination of the upper and lower limits listed above.

The isovaleric acid and/or 2-methyl butyric acid may be added to the white chocolate in many different ways. For example, it may be added to one or more of the ingredients used to manufacture the white chocolate, it may be added during the formulation of the white chocolate, it may be added to the white chocolate immediately after it has been formulated or at a later time. In some embodiments, the nonendogenous amount(s) of isovaleric acid and/or 2-methyl butyric acid may be mixed with a small amount of a white chocolate ingredient, such as cocoa butter, or a suitable carrier, prior to its addition to the white chocolate.

The present white chocolate comprises a dairy or dairy-derived component and a sweetener in a fat continuous system, and is substantially free of nonfat cocoa solids. Thus, "white chocolate" means SOI white chocolate and non-SOI white chocolate. Examples of non-SOI white chocolates result when the nutritive carbohydrate sweetener is replaced partially or completely; or when the cocoa butter or milkfat are replaced partially or completely; or when components that have flavors that imitate milk, butter or chocolate are added; or when other additions or deletions in formula are made outside the USFDA standard of identity of white chocolate; or combinations thereof.

The fat or oil in the fat continuous system may be selected from the group consisting of cocoa butter, cocoa butter equivalents, cocoa butter improvers, cocoa butter substitutes, cocoa butter replacers, cocoa butter extenders and vegetable fats other than cocoa butter, such as palm kernel, palm, illipe, sal, shea, kokum gurgi, mango kernel, coconut and mixtures thereof. An exemplary SOI chocolate would be one formulated with cocoa butter, whereas a non-SOI white chocolate would be one formulated with a cocoa butter equivalent. However, the white chocolate will desirably be substantially free of nonfat cocoa solids, i.e., containing less than 0.5% by weight nonfat cocoa solids, and more preferably, no more than a trace quantity, e.g., 0.1 wt % of nonfat cocoa solids.

In some embodiments, the white chocolate contains not less than about 20% by weight cocoa butter, as required by the U.S. standard of identity for white chocolate. Typically, the amount of cocoa butter present will be in a range of about 20% to about 60% by weight of the white chocolate, preferably about 20% to about 50% by weight of the white chocolate, and most preferably about 20% to about 40% by weight of the white chocolate.

In the context of a non-SOI white chocolate, it may be more convenient to refer to the total fat content, rather than specified fat ingredients such as cocoa butter or milkfat. The total fat content of a non-SOI white chocolate may be in a range of 15% by weight to 60% by weight, or 20% by weight to 55% by weight. Compositions at the low end of the stated total fat content range for non-SOI white chocolate might be utilized in a formed/extruded chip solid, whereas compositions at the high end of the range might be suitable to form thin coating material on an ice cream bar.

The white chocolate contains a dairy or dairy-derived component. The dairy or dairy-derived component may be from any dairy source in any form (e.g., a liquid or a dry powder), such as for example, cream, milkfat, butter, milk, dry whole milk, concentrated milk, evaporated milk, sweetened condensed milk, skim milk, concentrated skim milk, evaporated skim milk, sweetened condensed skim milk, nonfat dry milk, concentrated buttermilk, dried buttermilk, malted milk, anhydrous milkfat, whey, whey protein isolate or concentrate, casein, demineralized whey, caseinates, milk isolates, and the like.

The white chocolate described herein contains not less than about 5% by weight, or not less than 10% by weight, or even not less than 14% by weight total milk solids, where total milk solids is the total dry weight of the dairy or dairy-derived component(s) in the white chocolate. In some embodiments, the amount of total milk solids used in the white chocolate will be in a range of about 14% to about 50% by weight of the white chocolate, or from about 14% to about 40% by weight of the white chocolate, and or from about 14% to about 30% by weight of the white chocolate. In the case where the white chocolate is non-SOl white chocolate, the amount of total milk solids used is in the range of about 5% to about 50% by weight, and may be in the range of about 10% to about 40% by weight. The milk solids may be skim milk solids and/or whole milk solids.

Generally, the white chocolate will contain from 0% by weight up to about 30% by weight, preferably up to about 25% by weight, and more preferably up to about 20% by weight milkfat. SO1 white chocolate contains not less than about 3.5% by weight milkfat. Therefore, preferably, the amount of milkfat used in the white chocolate will be in a range of about 3.5% to about 30% by weight of the white chocolate, more preferably about 3.5% to about 25% by weight of the white chocolate, and most preferably about 3.5% to about 20% by weight of the white chocolate. The milkfat may be contributed by any of the many well-known milkfat-containing dairy ingredients or as a milkfat ingredient alone, for example, anhydrous milkfat.

The white chocolate contains a sweetener, which in non-SO1 white chocolate need not be a nutritive carbohydrate sweetener, and may comprise a nonnutritive sweetener. The sweetener may be in an amorphous or crystalline form.

In some embodiments, the white chocolate may contain at least one nutritive carbohydrate sweetener. Nutritive carbohydrate sweeteners with varying degrees of sweetness intensity are useful and may be any of those typically used in the art and include, but are not limited to, sucrose, (e.g. from cane or beet), dextrose, fructose, lactose, maltose, glucose syrup solids, corn syrup solids, invert sugar, hydrolyzed lactose, honey, maple sugar, brown sugar, molasses and the like. Liquid sucrose, corn syrup, and other amorphous sweeteners may also be used. The nutritive carbohydrate sweetener, preferably sucrose, will be present in the white chocolate as suspended crystals or particles. Preferably, the white chocolate contains a nutritive carbohydrate sweetener, and most preferably that sweetener is sucrose. When present, the nutritive carbohydrate sweetener is generally in an amount from about 0.5% to about 70% by weight of the white chocolate, preferably about 5.0% to about 55% by weight of the white chocolate, and most preferably about 5.0% to about 50% by weight of the white chocolate. In one embodiment, the nutritive carbohydrate sweetener will not exceed about 55% by weight of the white chocolate.

The white chocolate may also contain bulking agents. The term "bulking agents" as defined herein may be any of those typically used in the art and include polydextrose, polyfructose (inulin), other oligosaccharides, cellulose and its derivatives, maltodextrin, gum arabic, starches and modified food starches, and the like. In one embodiment, a bulking agent may partially replace the sweetener.

The white chocolate may contain a sugar replacer. The term "sugar replacer" includes sugar alcohols (polyols), or high potency sweeteners or combinations thereof. In some embodiments, a sugar replacer may partially replace the sweetener. The high potency sweeteners include aspartame, neotame, cyclamates, saccharin, acesulfame potassium, neohesperidin dihydrochalcone, sucralose, alitame, stevia sweeteners, glycyrrhizin, thaumatin and the like and mixtures thereof. In some embodiments, the high potency sweeteners are aspartame, cyclamates, saccharin, acesulfame potassium or combinations of these. Examples of sugar alcohols may be any of those typically used in the art and include sorbitol, mannitol, xylitol, maltitol, isomalt, lactitol and the like.

The white chocolate may also contain other optional ingredients, such as emulsifiers. Examples of safe and suitable emulsifiers may be any of those typically used in the art or having GRAS ("Generally Recognized as Safe") status, and include lecithin derived from vegetable sources such as soybean, safflower, corn, etc., fractionated lecithins enriched in either phosphatidyl choline or phosphatidyl ethanolamine or both, mono- and digylcerides, diacetyl tartaric acid esters of mono- and diglycerides (also referred to as DATEM), monosodium phosphate derivatives of mono- and diglycerides of edible fats or oils, sorbitan monostearate, hydroxylated lecithin, lactylated fatty acid esters of glycerol and propylene glycol, polyglycerol esters of fatty acids (e.g., polyglycerol ricinoleate (PGPR)), propylene glycol mono- and diester of fats and fatty acids, or any emulsifier that may become approved for the USFDA-defined soft candy category.

Other emulsifiers that can be used in the white chocolate include polyglycerol polyricinoleate, ammonium salts of phosphatidic acid, sucrose esters, oat extract, any emulsifier found to be suitable in chocolate or a similar fat/solid system, or any blend of these. In some embodiments, lecithin, fractionated lecithin, diacetyl tartaric acid esters of mono- and diglycerides (DATEM) or mixtures of these emulsifiers are used. In some embodiments, the white chocolate may include lecithin.

Typically, one or more emulsifier(s) may be incorporated in the enhanced white chocolate in an amount of about 0% to about 2.5% by weight, subject to local regulations and achievement of the desired functionality. For white chocolate meeting the requirements of the U.S. standard of identity, it is preferred to incorporate a maximum level of 1.5% by weight of any one emulsifier or mixture of emulsifiers.

The white chocolate will desirably be substantially free of free, or unbound, water, i.e., will comprise less than 3% by weight free water, or even less than 1% by weight free water. In some embodiments, the white chocolate is a solid at room temperature, i.e., 25° C., but will exist in a melted state at body temperature, i.e., 37° C.

The manufacture of white chocolate is well known and the present white chocolate may be prepared using the known techniques. In addition, the white chocolate may be prepared using known techniques to make compound coatings and confectionery coatings.

In the method, the isovaleric acid may be added during the formulation of the white chocolate or after the white chocolate is formulated. It may be added neat, or, may be mixed with a small amount of a carrier, such as cocoa butter, vegetable oil, propylene glycol, glycerol, triacetin, or other known carrier, prior to its addition.

Compounded flavors (mixtures of flavoring substances) may also contain isovaleric acid and/or 2-methyl butyric acid. Such amounts are considered endogenous amounts and are not included in the nonendogenous amounts described herein.

The white chocolate prepared by the present method exhibits a cooked milk, buttery, caramel essence, vanilla and/or nutty attribute score that is greater than that of a white chocolate not comprising the added amount of isovaleric acid and/or 2-methyl butyric acid at 6 weeks, 12 weeks, 26 weeks, 30 weeks or even 34 weeks or more. Additionally, the white chocolate prepared by the present method may also exhibit a nonfat dried milk score that is lower than that of a white chocolate not comprising the added amount of isovaleric acid and/or 2-methyl butyric acid at 6 weeks, 12 weeks, 26 weeks, 30 weeks or even 34 weeks or more.

It should be clear that the white chocolate described herein will not contain components in amounts that would deleteriously affect the enhanced organoleptic attributes of the inventive white chocolate, e.g., by introducing butyric aromatic notes including sweaty, sour, and/or cheesy, or by masking desired flavor attributes such as caramel essence of the white chocolate, and thus alter the nature of the invention. In some embodiments, butyric aromatic notes are not detected at 6 weeks while in other embodiments, the caramel essence score is not lower than a white chocolate not comprising the added amount of isovaleric acid and/or 2-methyl butyric acid at 6 weeks, 12 weeks, 26 weeks, 30 weeks or even 34 weeks or more.

EXAMPLES

Examples 1-11

For each of the examples, a commercially available SOl white chocolate (Blommer CASCADE) was used as the starting material and also served as the control in the sensory testing described below. 2 bars of each sample were tested at each time point. For Examples 1-5, nonendogenous amounts of 100, 250, 400, 800 (comparative) and 3000 (comparative) ppb, respectively, of isovaleric acid were added to the melted white chocolate. For Examples 6-11, nonendogenous amounts of 100, 250, 400, 800, 2000 and 3000 ppb, respectively, of 2-methylbutyric acid were added to the melted white chocolate. The white chocolate containing the added isovaleric acid or 2-methylbutyric acid was tempered, deposited into molds, and allowed to cool. 2 control bars were also prepared, containing no nonendogenous amounts of either isovaleric acid or 2-methyl-butyric acid.

Descriptive analysis evaluation using the Spectrum™ method was conducted on 2 bars of each inventive and comparative sample at 6, 12, 26, 30 and 34 weeks. The results of these experiments are shown in FIG. 1-10. As shown, all inventive samples showed at least one enhanced attribute of cooked milk, butter, caramel essence, vanilla or nutty as compared with the control samples at up to 34 weeks.

Examples 12-18

For each of examples 12-18, a commercially available SOl white chocolate (Blommer CASCADE) was used as the starting material and also served as the control in the associated sensory testing described below. 6 bars of each sample were tested at each time point. For inventive example 12 a nonendogenous amount of 250 ppb of isovaleric acid was added to the melted white chocolate. For comparative example 13, 600 ppb of isovaleric acid was added to the melted white chocolate. For inventive examples 14 and 15, 1000 ppb and 3000 ppb, respectively, were added to the melted white chocolate. For inventive example 16, 250 ppb of isovaleric acid and 100 ppb of 2-methylbutyric acid were added to the melted chocolate. Finally, for inventive example 17, 400 ppb isovaleric acid and 250 ppb of 2-methyl-butyric acid were added to the melted white chocolate. Table 2, below, provides a summary of the samples prepared for each example.

TABLE 2

| Example No. | IVA Concentration (ppb) | MBA Concentration (ppb) |
| --- | --- | --- |
| 12 - inventive | 250 | — |
| 13 - comparative | 600 | — |
| 14 - inventive | — | 1000 |
| 15 - inventive | — | 3000 |
| 16 - inventive | 250 | 100 |
| 17 - inventive | 400 | 250 |

The white chocolate containing the added isovaleric acid and/or 2-methylbutyric acid was tempered, deposited into molds, and allowed to cool. Control bars were prepared similarly, containing no nonendogenous amounts of either isovaleric acid or 2-methyl-butyric acid.

Figure 11:
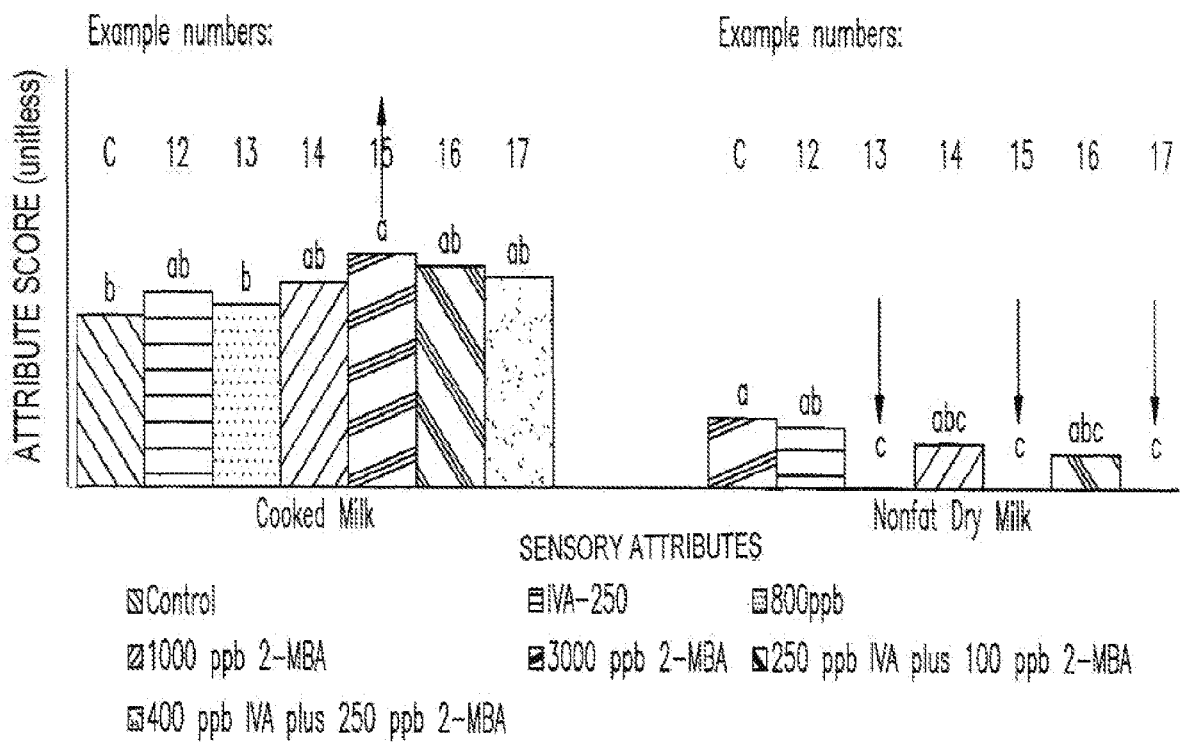
FIG. 11 is a bar graph illustrating descriptive analysis results of a control white chocolate and white chocolate containing 250 ppb isovaleric acid ("IVA"), 600 ppb IVA, 1000 ppb 2-methylbutyric acid ("MBA"), 3000 ppb MBA, 250 ppb IVA and 100 ppb MBA or 400 ppb IVA and 250 ppb MBA at 6 weeks.
Figure 12:
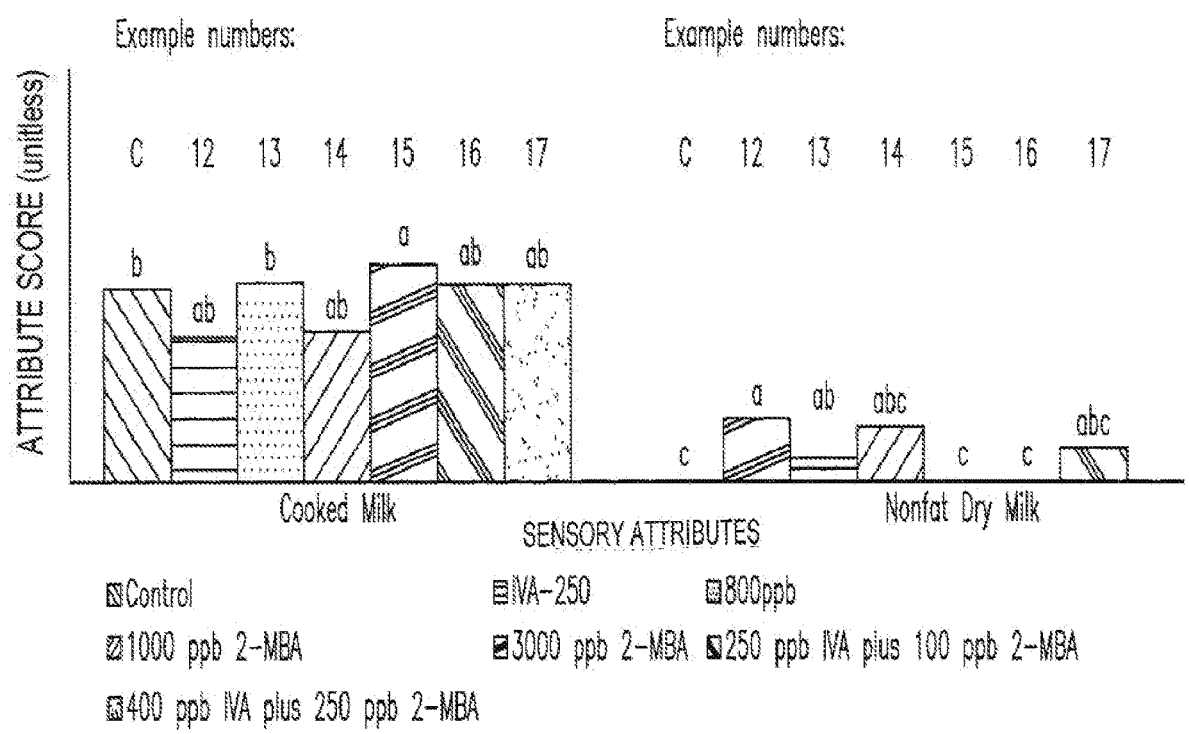
FIG. 12 is a bar graph illustrating descriptive analysis results of a control white chocolate and white chocolate containing 250 ppb isovaleric acid ("IVA"), 600 ppb IVA, 1000 ppb 2-methylbutyric acid ("MBA"), 3000 ppb MBA, 250 ppb IVA and 100 ppb MBA or 400 ppb IVA and 250 ppb MBA at 20 weeks.

Descriptive analysis was conducted on 6 bars of each inventive and comparative sample at 6 and 20 weeks. The results of these experiments are shown in FIG. 11-12, wherein example numbers are provided above the bar to which the example pertains and statistical significance is indicated by the small letters located above the bars. Where a data sets shown by the bars share a small letter, those data sets are not significantly different. Where data sets do not share any small letters, those data sets are significantly different.

As shown in FIG. 11, at 6 weeks, example 15 which had 3000 ppb of MBA was the only sample having a significantly different response relative to control and example 15 had significantly more cooked milk attribute. As to nonfat dry milk, examples 13, 15, and 17 had significantly less nonfat dry milk attribute than the control.

As shown in FIG. 12, at 20 weeks examples 12 (containing 250 ppb IVA) and 14 (containing 1000 ppb MBA) had significantly less cooked milk attribute than the control and inventive samples while examples 12 and 14 had significantly more nonfat dried milk.

Taking the 6 and 12 week data set together, example 14 having 3000 ppb MBA performed well with significantly more cooked milk and significantly less nonfat dry milk at 6 weeks and having numerically more cooked milk with comparable nonfat dry milk attribute relative to control at 20 weeks.

Comparative Example 1

An amount of butyric acid was added to 0.5 grams of vegetable oil carrier so that the addition of the mixture to 500 grams of melted commercially available white chocolate targeted an addition of 800 ppb of butyric acid. Sensory evaluation of the resulting composition showed the composition had a sour milk attribute and the organoleptic attributes of the white chocolate were not enhanced.

Comparative Example 2

It was determined that the commercially available white chocolate of Comparative Example 1 contained about 458 ppb of endogenous butyric acid. Butyric acid in a vegetable oil carrier was then added to the commercially available white chocolate of Comparative Example 1 to bring the level of butyric acid to about 800 ppb in the finished white chocolate. Sensory evaluation of the resulting composition revealed that the composition had an unpleasant sour milk-like attribute and the organoleptic attributes of the white chocolate were not enhanced.

Comparative Example 3

An amount of isobutyric acid was added to 0.5 grams of vegetable oil carrier so that the addition of the mixture to 500 grams of melted commercially available white chocolate targeted an addition of 800 ppb of isobutyric acid. Sensory evaluation of the resulting composition showed the composition had a rancid character and the organoleptic attributes of the white chocolate were not enhanced.

Comparative Examples 4-7

An amount of valeric acid was added to 0.5 grams of vegetable oil carrier so that the addition of the mixture to 500 grams of melted commercially available white chocolate targeted an addition of 600 ppb of valeric acid. Compositions were also prepared in a similar manner, targeting the addition of 700 ppb, 800 ppb and 900 ppb valeric acid. Sensory evaluation of the resulting compositions revealed that the compositions had a sharp cheese-like character and the organoleptic attributes of the white chocolate were not enhanced.

The invention claimed is:

1. A white chocolate comprising an added, nonendogenous amount of isovaleric acid from 100 ppb to 250 ppb, wherein an overall content of isovaleric acid in the white chocolate is less than 325 ppb, and wherein the white chocolate has a cooked milk attribute score greater than that of a white chocolate containing at least 800 ppb isovaleric acid, for an extended period of time of 26 to 34 weeks.

2. The white chocolate of claim 1, further comprising up to about 3000 ppb of nonendogenous 2-methyl butyric acid.

3. The white chocolate of claim 1, further comprising up to about 1000 ppb of nonendogenous 2-methyl butyric acid.

4. The white chocolate of claim 1, wherein the white chocolate meets the US, European, Canadian, and/or Australian standard of identity for white chocolate.

5. The white chocolate of claim 1, wherein the white chocolate meets the US standard of identity for white chocolate.

6. The white chocolate of claim 1, wherein the white chocolate is a white chocolate that is substantially similar to the US standard of identity for white chocolate.

7. The white chocolate of claim 1, further comprising from 10 ppb to 3000 ppb of nonendogenous 2-methyl butyric acid.

8. The white chocolate of claim 1, further comprising greater than 350 ppb of nonendogenous 2-methyl butyric acid.

9. The white chocolate of claim 1, wherein the white chocolate has a cooked milk attribute score greater than that of a white chocolate containing at least 800 ppb isovaleric acid at 30 weeks.

10. The white chocolate of claim 1, wherein the white chocolate has a cooked milk attribute score greater than that of a white chocolate containing at least 800 ppb isovaleric acid at 34 weeks.

11. A method of producing white chocolate, wherein the method comprises adding from 100 ppb to 250 ppb isovaleric acid to the white chocolate during or after the preparation thereof, wherein the white chocolate after production has an overall content of isovaleric acid less than 325 ppb, and wherein the white chocolate has a cooked milk attribute score greater than that of a white chocolate containing at least 800 ppb isovaleric acid, for an extended period of time of 26 to 34 weeks.

12. The method of claim 11, further comprising adding up to about 3000 ppb 2-methyl butyric acid to the white chocolate.

13. The method of claim 11, further comprising adding up to about 1000 ppb 2-methyl butyric acid to the white chocolate.

14. The method of claim 11, wherein the isovaleric acid is added during the formulation of the white chocolate.

15. The method of claim 11, wherein the isovaleric acid is added to a melted white chocolate.

16. The method of claim 14, wherein the isovaleric acid is mixed with an ingredient of the white chocolate prior to addition to the white chocolate.

17. The method of claim 11, wherein the white chocolate meets the US, European, Canadian, and/or Australian standard of identity for white chocolate.

18. The method of claim 17, wherein the white chocolate meets the US standard of identity for white chocolate.

19. The method of claim 11, wherein the white chocolate is a white chocolate that is substantially similar to the US standard of identity for white chocolate.

20. A method of producing white chocolate, wherein the method comprises adding from 100 ppb to 250 ppb isovaleric acid to the white chocolate during or after the preparation thereof, wherein the white chocolate after production has an overall content of isovaleric acid less than 325 ppb, and wherein the white chocolate has a cooked milk attribute score that is greater than that of a white chocolate comprising at least 800 ppb isovaleric acid at 30 weeks.

21. The method of claim 20, wherein the white chocolate has a buttery, caramel essence, and/or vanilla attribute score greater than that of a white chocolate comprising at least 800 ppb isovaleric acid at 30 weeks, and/or a sour attribute score that is lower than that of a white chocolate comprising at least 800 ppb isovaleric acid at 30 weeks.

22. The method of claim 20, wherein the white chocolate has a sweaty attribute score that is lower than that of a white chocolate comprising at least 800 ppb isovaleric acid for at least 6 weeks.

23. The method of claim 20, wherein the white chocolate has a sweaty attribute score that is lower than that of a white chocolate comprising at least 800 ppb isovaleric acid for at least 30 weeks.

24. The method of claim 20, wherein the isovaleric acid is added during the formulation of the white chocolate.

25. The method of claim 20, wherein the isovaleric acid is added to a melted white chocolate.

26. The method of claim 20, wherein the isovaleric acid is mixed with an ingredient of the white chocolate prior to its addition to the white chocolate.

27. The method of claim 20, wherein the white chocolate is a white chocolate that is substantially similar to the US standard of identity for white chocolate.

* * * * *